United States Patent [19]

Mueller et al.

[11] Patent Number: 5,752,183
[45] Date of Patent: May 12, 1998

[54] METHOD AND APPARATUS FOR REDUCING POWER CONSUMPTION IN A SUBSCRIBER UNIT OF A COMMUNICATION SYSTEM

[75] Inventors: Bruce Dale Mueller, Palatine; Michael Russell Mannette, Bloomingdale; James Robert Kelton, Oak Park, all of Ill.

[73] Assignee: Motorola, Inc., Schaumburg, Ill.

[21] Appl. No.: 618,546

[22] Filed: Mar. 19, 1996

[51] Int. Cl.⁶ .................................................. H04B 1/16
[52] U.S. Cl. ........................ 455/343; 455/38.3; 455/575
[58] Field of Search .............................. 455/38.3, 54.1, 455/229, 343, 575, 67.1, 517; 370/311

[56] References Cited

U.S. PATENT DOCUMENTS 5,101,510  3/1992  Duckeck .................................. 455/343
5,384,564  1/1995  Wycoff .................................... 455/343

*Primary Examiner*—Nguyen Vo
*Attorney, Agent, or Firm*—J. Ray Wood

[57] ABSTRACT

A method and apparatus reduce power consumption in a subscriber unit of a communication system. The subscriber unit has a processor (10) for processing non-voice messages received from the communication system. The method includes the steps of receiving a communication signal (18) at the subscriber unit, detecting a presence or an absence of non-voice messages (20) in the communication signal, and disabling the processor (24) in response to detecting the absence of non-voice messages in the communication signal. The apparatus includes a receiver (12), a message detector (14) and a controller (16) for carrying out the foregoing steps.

9 Claims, 2 Drawing Sheets

METHOD AND APPARATUS FOR REDUCING POWER CONSUMPTION IN A SUBSCRIBER UNIT OF A COMMUNICATION SYSTEM

BACKGROUND

This invention relates generally to a communication system and more particularly to apparatus for reducing power consumption in a subscriber unit of such a system.

In some wire line communication systems, operating power for individual subscriber units is provided through the line of the system, rather than at the individual subscriber locations. In such systems, it is therefore important to minimize the power requirements of each subscriber, to thereby minimize the power carrying requirements of the system as a whole. By thus minimizing the overall system power requirements, savings may be realized in the overall cost of power generation and distribution, including the cost of the power handling and distribution components of the system, whether the power is generated by the system or purchased from a utility.

Accordingly, it would be desirable to reduce the power consumption of the subscriber unit in a communication system of the above-mentioned type.

DETAILED DESCRIPTION OF THE PREFERRED EMBODIMENT

The present invention will be described with specific reference to the handling of voice communications in a hybrid fiber-coaxial (HFC) cable communication system.

In voice communications, the majority of time is spent sending voice data between the subscriber unit and the communication system infrastructure. Occasionally, a non-voice message, that is, message data other than voice, is exchanged between the subscriber unit and the infrastructure. The message handling system of the subscriber unit, usually in the form of a microcontroller or processor, is generally required only when a non-voice message is present, i.e., when a non-voice message is being passed between the subscriber unit and the infrastructure. Operation of the microcontroller or processor is not required when only voice data is being exchanged between the subscriber unit and the infrastructure and non-voice message is absent. That is, operation of the microcontroller or processor is not necessary in order to process only voice data or information.

Figure 1:
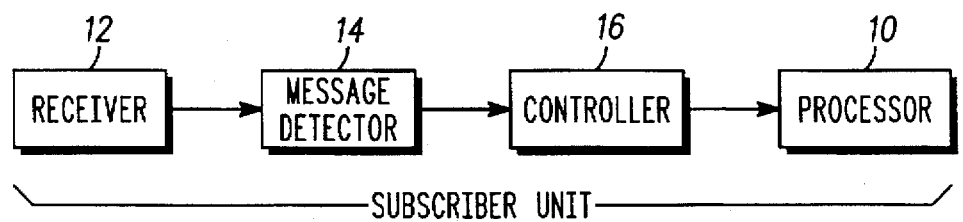
FIG. 1 is a block diagram, showing apparatus in accordance with one embodiment consistent with the invention.
Figure 2:
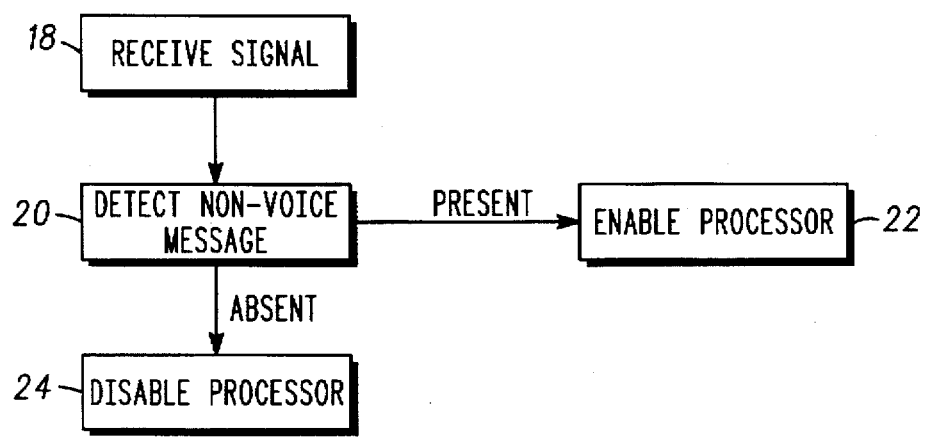
FIG. 2 is a flow chart, illustrating a method for reducing power consumption.

Referring now to FIGS. 1 and 2, the invention provides a method and apparatus for reducing power consumption in a subscriber unit of a communication system. Relevant portions of the subscriber unit are illustrated in block form in FIG. 1. Steps of this method are diagrammatically illustrated in FIG. 2.

Referring first to FIG. 1, the subscriber unit includes a processor 10 for processing non-voice messages received from the communication system. The subscriber unit also includes a receiver portion 12 for receiving a communication signal at the subscriber unit. Generally speaking, in such a communication system, non-voice message data is not present at all times. When a non-voice message is absent, predetermined null message data fills the messaging space in the communication signal. On the other hand, when a non-voice message is present, non-null message data is in the messaging space of the communication signal.

Accordingly, the apparatus of the preferred embodiment in the subscriber unit includes a message detector 14 which operates to detect the presence or absence of a non-voice message in the communication signal. A controller 16 is responsive to the presence or absence of a non-voice message as determined by the message detector 14 for enabling the processor when a non-voice message is present, or for disabling the processor 10 in the absence of a non-voice message. In operation, the processor 10 is responsive to a receiver interrupt signal for going to a powered up state for processing non-voice messages. In accordance with a preferred embodiment, the message detector 14 is responsive to predetermined null message data for producing a null interrupt control signal, and is responsive to non-null message data for producing a non-null interrupt control signal. The controller 16 may comprise an interrupt control circuit which is operatively coupled with the processor 10 and is responsive to the non-null interrupt control signal from the message detector for providing the receiver interrupt signal to the processor. On the other hand, this interrupt control circuit is responsive to the null interrupt control signal from the message detector for withholding the receiver interrupt signal from the processor. Thus, null message data indicates the absence of non-voice data, such that the interrupt to the processor is to be withheld, whereas non-null message data indicates a presence of non-voice messages, such that the interrupt to the processor is to be provided.

Referring to FIG. 2, the method of the invention thus proceeds by initially receiving the communication signal as indicated at block 18, and then detecting the presence or absence of a non-voice message in the communication signal as indicated at block 20. In accordance with the method of the invention, the processor 10 is enabled in response to detecting the presence of a non-voice message in the communication signal as indicated at block 22. On the other hand, the processor is disabled, as indicated in block 24, in response to detecting the absence of non-voice messages in the communication signal. In accordance with a preferred embodiment, disabling the processor comprises withholding an interrupt to the processor, whereas the enabling of the processor comprises providing an interrupt to the processor.

Figure 3:
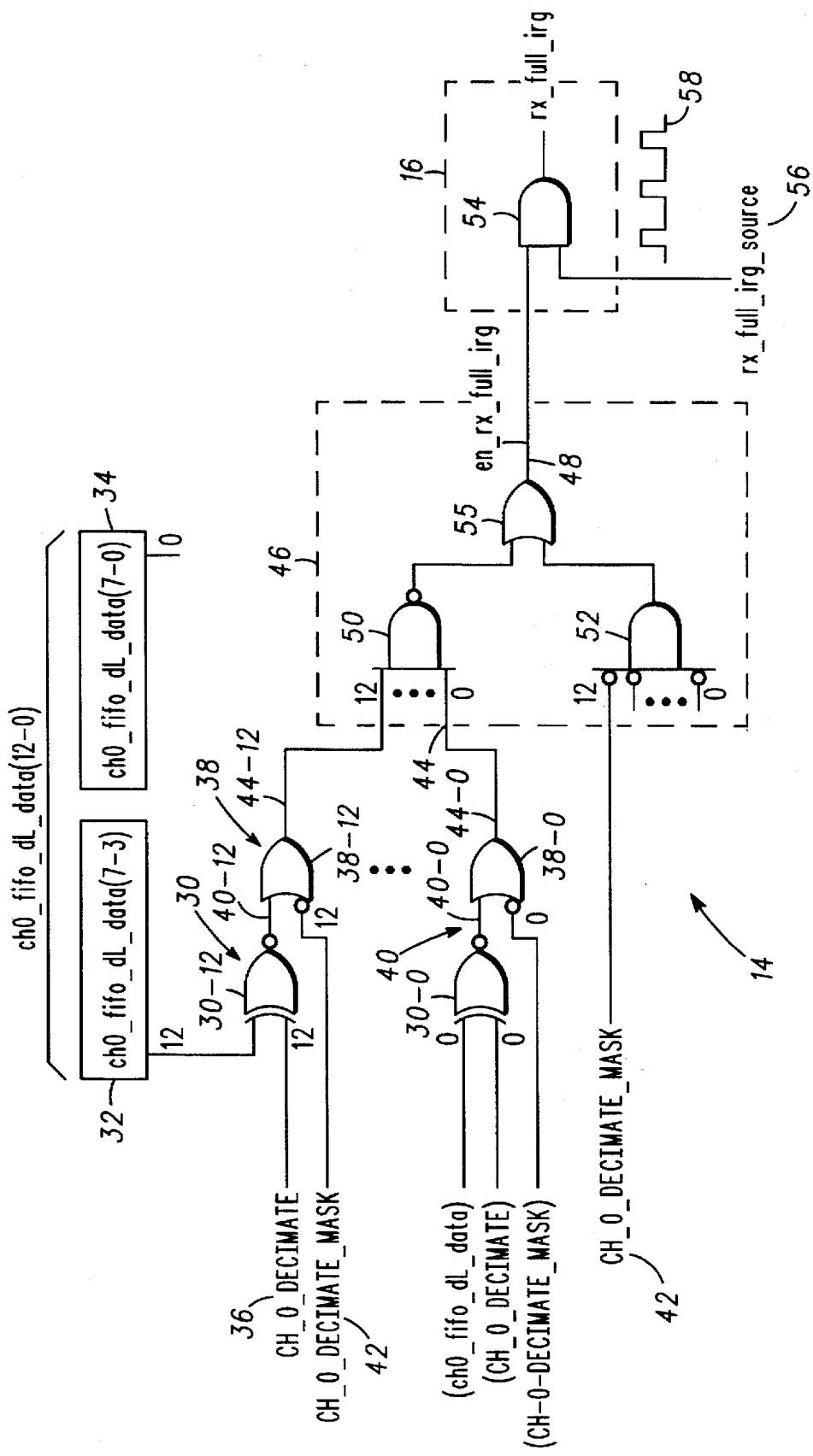
FIG. 3 illustrates a logic circuit embodied as a series of interconnected discrete logic elements in accordance with one embodiment consistent with the invention.

Referring now also to FIG. 3, FIG. 3 illustrates a discrete logic circuit embodiment of message detector 14. First, the structure will be described, and then the function of the circuit will be described.

Referring to FIG. 3 for understanding the structure of message detect circuit 14, a series of logic gates for carrying out the above-described functions of the message detector 14 and controller 16 is illustrated. Generally speaking, in the embodiment illustrated in FIG. 3, the message detector 14 comprises a first logic portion 30 which compares received message data from two registers 32, 34 with predetermined null message data from a register 36 and produces a corresponding first logic output 40. A second logic portion 38 receives this first logic output and is responsive to mask signal data from a register 42 for selectively enabling and disabling the first logic output 40 at a second logic output 44. A third logic portion 46 receives the second logic output 44 and the mask signal data from the register 42 and is responsive thereto for producing a corresponding third logic output 48 which comprises one of the null interrupt control signal and non-null interrupt control signal mentioned above, in a predetermined systematic fashion.

In the embodiment illustrated in FIG. 3, the first, second and third logic portions 30, 38 and 46 comprise a plurality of interconnected logic gates. In the embodiment shown in FIG. 3, the received message data in registers 32 and 34, as well as the predetermined null message data in register 36 and mask data in register 42 each comprise thirteen bits of data. Thus, the first logic portion 30 includes a plurality of similar exclusive OR gates 30-0 . . . 30-12 for comparing the received message data with the null message data on a bit-by-bit basis. Each of the gates 30-0 . . . 30-12 receives a like-numbered bit of information (0 . . . 12) from each of the registers 32 and 36.

Similarly, the second logic portion 38 comprises a plurality of NOR gates 38-0 . . . 38-12 for enabling and disabling the first logic outputs 40 on a bit-by-bit basis. Thus, one input of each gate 38-0 . . . 38-12 receives a like-numbered output 40-0 . . . 40-12 of one of the gates 30-0 . . . 30-12, while the other input of each gate 38-0 . . . 38-12 receives a like-numbered bit (0 . . . 12) from the register 42.

The third logic portion 46 comprises two 12-input NAND gates 50, 52 and an OR gate 54. The NAND gate 50 receives the twelve outputs 44-0 . . . 44-12 of the gates 38-12 . . . 38-0, while the NAND gate 52 receives the bits (0 . . . 12) from the register 42.

The controller 16 in FIG. 3 is illustrated as an AND gate 55, which receives the logic output 48 from the third logic portion 46 and also a receiver interrupt signal from a source 56, this signal being here illustrated as a clock signal, and designated by reference numeral 58.

The first, second and third logic portions may alternatively comprise an integrated circuit element. Preferably, this integrated circuit element comprises a very high speed integrated circuit, which is constructed in accordance with a series of predetermined instructions in a very high speed integrated circuit (VHSIC) hardware description language (VHDL). One example of such a series of instructions is reproduced hereinbelow:

indicating that non-voice messages are present and therefore that the proccessor should be interrupted. Bit stream ch0__fifo__dL__data (12-0)is made up of two portions 32 and 34, which are indicated in the foregoing VHDL listing.

Each of the bits in bit stream ch0__fifo__dL__data (12-0) is compared to a corresponding bit in bit pattern CH__0__DECIMATE 36, via exclusive OR gates 30 (12-0). Bit pattern CH__0__DECIMATE 36 is typically programmed with the non-null message pattern. A match of all of the bits results in high output of 12 input and gate 50, thereby generating the processor interrupt out of AND gate 55.

The bit pattern CH__0__DECIMATE MASK 42 (bits 12-0) allows some added flexibility in the operation of message detector 14. Essentially MASK 42 provides for the specific selection of which bits 12-0 of stream ch__0__fifo__dL__data and corresponding bits of CH__0__DECIMATE are used in the comparison to determine if a processor interrupt is needed. If a one is set in a particular bit of MASK 42, then that corresponding bit is used in the comparison. This is accomplished via OR gate 38. Consequently, message detect circuit 14 can efficiently identify non-null message data using only a portion of the bit stream ch__0__fifo__dL__data, if desired.

One further feature facilitated by the bit pattern CH__0__DECIMATE MASK 42, is that AND gate 50 allows a processor interrupt to be generated for every incoming data stream (voice or non-voice message), when MASK 42 is set to all zeros. This enhances robustness of the system because the message detector can essentially be disabled by writing all zeros to MASK 42, and the processor will be interrupted for every incoming data.

What is claimed is:

1. An apparatus for reducing power consumption in a subscriber unit of a communication system, the subscriber unit including a processor for processing non-voice messages received from the communication system; said apparatus comprising: a receiver for receiving a communication signal at the subscriber unit; a message detector for detecting one of a presence and an absence of non-voice messages in the communication signal and responsive to predetermined null message data for producing a null interrupt control signal, and responsive to non-null message data for produc-

```
F CH_0_DECIMATE_MASK = "0000000000000" THEN
       en_rx_full_irq      <='1';
    ELSIF ch0_decimate = '1' AND dl_wr_addr = to_qsim_state(3,5)AND write_ch0_fifo_dl =
'1'THEN
       IF (NOT(ch0_fifo_dl_data(7DOWNTO 3)XOR CH_0_DECIMATE(12DOWNTO 8)) OR
          NOT CH_0_DECIMATE_MASK(12DOWNTO 8)) = "1111" THEN
          en_rx_full_irq      <='0';
       ELSE
          en_rx_full_irq      <='1';
       END IF;
    ELSIF ch0_decimate = '1' AND dl_wr_addr = to_qsim_state(4,5) AND write_ch0_fifo_dl =
'1'THEN
       IF (NOT (ch0_fifo_dl_data(7 DOWNTO 0) XOR CH_0_DECIMATE(7 DOWNTO 0))
OR
          NOT CH_0_DECIMATE_MASK(7 DOWNTO 0)) = "11111111" THEN
          en_rx_full_irq      <= en_rx_full_irq;
       ELSE
          en_rx_full_irq      <='1';
       END IF;.
```

The operation of message detect circuit 14 is as follows. Bit stream ch0__fifo__dL__data (12-0) is a 13 bit bit stream which are the bits in the downlink information that are are either null message data indicating that voice and not non-voice messages are present, or non-null message data ing a non-null interrupt control signal; and a controller for disabling the processor in response to detecting the absence of a non-voice message in the communication signal and for enabling the processor in response to detecting the presence of a non-voice message in the communication signal, the message detector comprising a first logic portion for comparing received message data with predetermined null message data and for producing a corresponding first logic output; a second logic portion responsive to mask signal data for selectively enabling and disabling said first logic output at a second logic output; and a third logic portion for receiving said second logic output and said mask data and responsive thereto for producing a corresponding third logic output comprising one of said null interrupt control sianal and said non-null interrupt control signal in a predetermined, systematic fashion.

2. The apparatus according to claim 1, wherein said first, second and third logic portions comprise a very high speed integrated circuit constructed in accordance with a series of predetermined instructions in a very high speed integrated circuit hardware description language.

3. The apparatus according to claim 1, wherein said received message data, said predetermined null message data and said mask data each comprise multiple bits of data, wherein said first logic portion is capable of comparing the received message data with the predetermined null message data on a bit-by-bit basis, and wherein said second logic portion is capable of enabling and disabling said first logic output on a bit-by-bit basis.

4. In a subscriber unit for a communication system, said subscriber unit having a receiver for receiving a communication signal and processor for processing non-voice messages received from the communication system and responsive to a receiver interrupt signal for going to a powered up state, an improvement comprising: a message detector for detecting one of a presence and an absence of non-voice messages in the communication signal, the message detector responsive to predetermined null message data for producing a null interrupt control signal, and responsive to non-null message data for producing a non-null interrupt control signal, wherein the message detector comprises a first logic portion for comparing received message data with predetermined null message data and for producing a corresponding first logic output; a second logic portion responsive to mask signal data for selectively enabling and disabling said first logic output at a second logic output, and a third logic portion for receiving said second logic output and said mask data and responsive thereto for producing a corresponding third logic output comprising one of said null interrupt control signal and said non-null interrupt control signal in a predetermined fashion.

5. The improvement according to claim 4, and further including an interrupt signaller operatively coupled with said processor and responsive to said non-null interrupt control signal for delivering said receiver interrupt signal to said processor and responsive to said null interrupt control signal for withholding said receiver interrupt signal from said processor.

6. The improvement according to claim 4 wherein said first, second and third logic portions comprise a plurality of interconnected logic gates.

7. The improvement according to claim 4 where said first, second and third logic portions comprise an integrated circuit element.

8. The improvement according to claim 7 wherein said integrated circuit element comprises a very high speed integrated circuit constructed in accordance with a series of instructions in a very high speed integrated circuit hardware description language.

9. A method comprising the steps of:

receiving a communication signal at a subscriber unit of a communication system;

detecting a one of a presence and an absence of non-voice messages in a communication signal;

producing a null interrupt control signal in response to predetermined null message data;

producing a non-null interrupt control signal in response to non-null message data;

disabling a processor for processing non-voice messages in the communication signal, the step of disabling in response to detecting the absence of a non-voice message in the communication signal; and enabling the processor in response to detecting the presence of a non-voice message in the communication signal, wherein the step of detecting comprises the steps of:

comparing received message data with predetermined null message data to produce a corresponding first logic output;

selectively enabling and disabling the first logic output in response to mask signal data to produce a second logic output, and producing the one of the null interrupt control signal and the non-null interrupt control signal in response to receiving the second logic output and the mask data.

* * * * *